United States Patent
Walley et al.

(10) Patent No.: US 9,331,518 B2
(45) Date of Patent: May 3, 2016

(54) ADAPTIVE MULTI-PATHWAY WIRELESS POWER TRANSFER

(71) Applicants: John Walley, Ladera Ranch, CA (US); Reinier van der Lee, Lake Forest, CA (US)

(72) Inventors: John Walley, Ladera Ranch, CA (US); Reinier van der Lee, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 758 days.

(21) Appl. No.: 13/630,941

(22) Filed: Sep. 28, 2012

(65) Prior Publication Data
US 2014/0091633 A1    Apr. 3, 2014

(51) Int. Cl.
*H01F 38/14* (2006.01)
*H02J 7/02* (2016.01)
*H02J 5/00* (2016.01)

(52) U.S. Cl.
CPC   *H02J 7/025* (2013.01); *H02J 5/005* (2013.01)

(58) Field of Classification Search
CPC .................................. H02J 5/005; H02J 7/025
USPC ........................................................ 307/104
See application file for complete search history.

(56) References Cited

U.S. PATENT DOCUMENTS

| | | | |
|---|---|---|---|
| 7,948,208 B2 * | 5/2011 | Partovi et al. | 320/108 |
| 8,138,921 B1 * | 3/2012 | Cleeves et al. | 340/572.3 |
| 2011/0115432 A1 * | 5/2011 | El-Maleh et al. | 320/108 |
| 2012/0013198 A1 * | 1/2012 | Uramoto et al. | 307/104 |
| 2012/0223592 A1 * | 9/2012 | Kamata | 307/104 |
| 2013/0119773 A1 * | 5/2013 | Davis | 307/104 |
| 2014/0001874 A1 * | 1/2014 | Nahidipour | 307/104 |

* cited by examiner

*Primary Examiner* — Thienvu Tran
*Assistant Examiner* — Kevin J Comber
(74) *Attorney, Agent, or Firm* — Sterne, Kessler, Goldstein & Fox P.L.L.C.

(57) ABSTRACT

Adaptive multi-pathway wireless charging is described. In one aspect, embodiments enable one or more wireless charging pathways to be established concurrently in a wireless charging environment. The wireless charging pathways use same or different frequencies, powers, wireless power transfer (WPT) standards, and WPT configurations. Embodiments for adaptively configuring wireless charging based on detected events or changes in WPT characteristics are also provided.

17 Claims, 19 Drawing Sheets

ADAPTIVE MULTI-PATHWAY WIRELESS POWER TRANSFER

FIELD OF THE INVENTION

The present disclosure relates generally to wireless power transfer (WPT).

BACKGROUND

Background Art

Existing wireless charging approaches use a single wireless charging pathway for all charging needs in an environment. Typically, the wireless charging pathway is enabled by a single coil in the charging device and a single coil in the recipient device. Further, the coil in each device is designed to operate according to pre-defined and fixed WPT standard, amplitude, phase, and frequency.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1A:
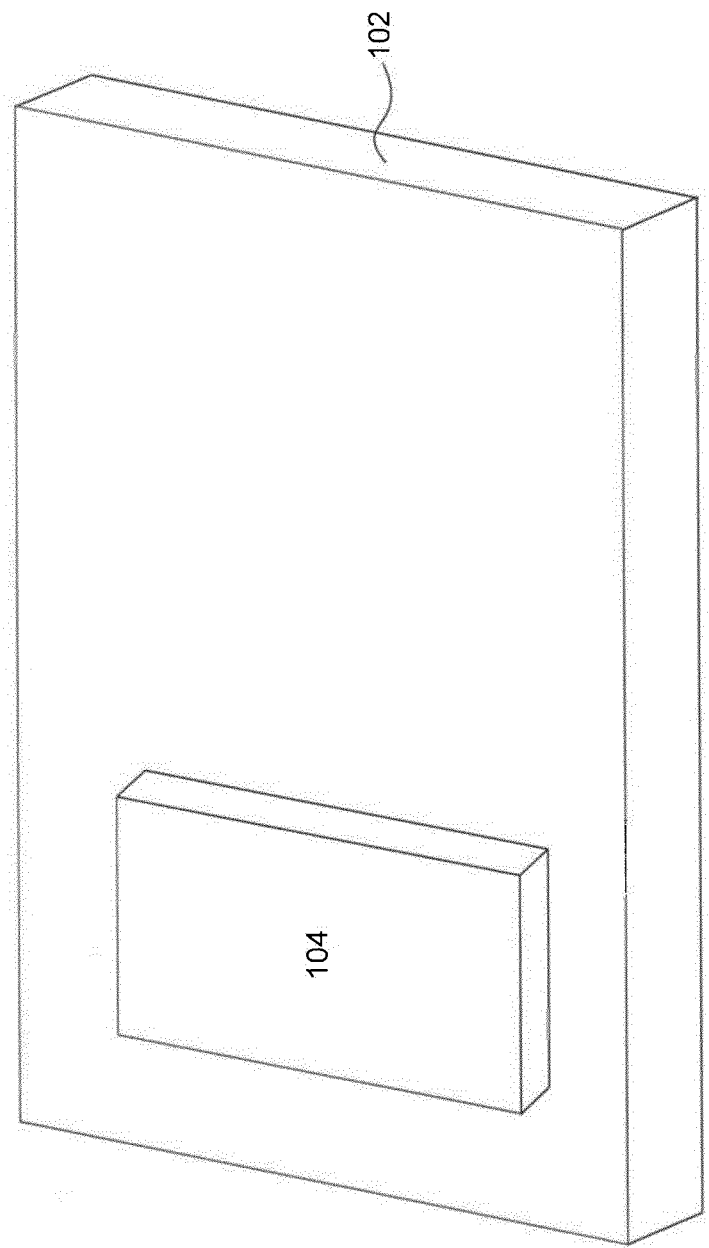
FIG. 1A illustrates an example environment according to an embodiment of the present disclosure.

FIG. 1A illustrates an example environment 100A according to an embodiment of the present disclosure. Example environment 100A is provided for the purpose of illustration and is not limiting of embodiments of the present disclosure. As shown in FIG. 1A, example environment 100A includes a wireless power transfer (WPT) source device 102 and a WPT recipient device 104. WPT source device 102 may be, without limitation, a charging station, a power mat, a power pad, or a power dock, for example. WPT source device 102 may be powered by a battery or an external power source. WPT recipient device 104 may be, without limitation, a cellular phone, a gaming device, a phone headset, a music player, a digital camera, or any portable device, for example.

WPT source device 102 may be configured to wirelessly charge WPT recipient device 104. Wireless charging may be done using inductive or conductive charging. Inductive charging uses an electromagnetic field to transfer energy between an inductive structure of WPT source device 102 and an inductive structure of WPT recipient device 104. Inductive charging may be achieved by placing WPT recipient device 104 in close proximity to or direct contact with WPT source device 102 to create a wireless charging pathway between the two devices. Conductive charging uses direct electrical contact between WPT source device 102 and WPT recipient device 104.

WPT recipient device 104 may be placed on WPT source device 102 as shown in FIG. 1A to perform wireless charging. WPT recipient device 104 may be placed on WPT source device 102 in a particular manner, specified graphically, for example, on WPT source device 102, or simply laid on top of WPT source device 102 in no particular way. For example, for conductive charging, WPT recipient device 104 may be placed in a specified manner on top of WPT source device 102 in order to align electrical contacts of WPT recipient device 104 with electrical contacts of WPT source device 102. In contrast, inductive charging may only require that WPT recipient device 104 be in close proximity to WPT source device 102 with no particular placement or orientation. In an embodiment, WPT source device 102 and WPT recipient device 104 also establish a communication channel when WPT recipient device 104 is brought in a vicinity of WPT source device 102. The communication channel can be used to control the charging as further described below. The communication channel can implement any known wireless protocol, including WiFi, Bluetooth, NFC, etc.

Existing wireless charging approaches use a single wireless charging pathway for all charging needs in an environment. Typically, the wireless charging pathway is enabled by a single coil in the charging device and a single coil in the recipient device. Further, the coil in each device is designed to operate according to pre-defined and fixed proprietary WPT standard, amplitude, phase, and frequency. The utility and versatility of the charging device in enabling wireless charging is therefore limited.

In one aspect, embodiments of the present disclosure enable one or more wireless charging pathways to be established concurrently in a wireless charging environment. An example embodiment 200A of WPT source device 102, which may be used to establish such one or more wireless charging pathways, is shown in FIG. 2A.

Figure 2A:
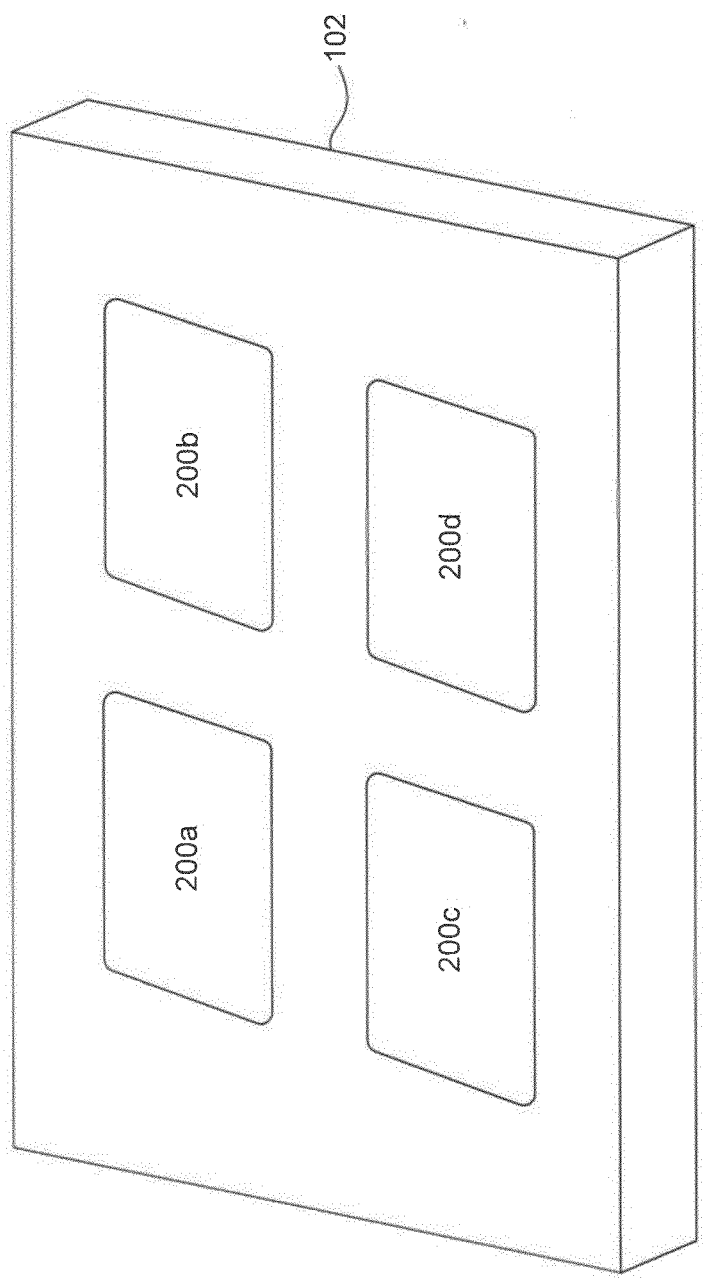
FIG. 2A illustrates an example wireless power transfer (WPT) source device according to an embodiment of the present disclosure.

As shown in FIG. 2A, example embodiment 200A includes a plurality of coils 200a, 200b, 200c, and 200d. In embodiments, coils 200a-d may be individually controlled as desired. For example, each of coils 200a-d may be turned on or off, independently of the others. As such, in the presence of one or more WPT recipient devices, such as WPT recipient device 104, for example, coils 200a-d may be controlled to create one or more wireless charging pathways with the inductive structure of each WPT recipient device.

One-to-one, one-to-many, and many-to-one wireless charging configurations may be enabled. For instance, in an example configuration, coil 200a may establish a single wireless charging pathway with a first WPT recipient device (not shown in FIG. 2A). Coil 200b may establish two separate wireless charging pathways with second and third WPT recipient devices (not shown in FIG. 2A), and coil 200c may also establish a wireless charging pathway with one of the second and third WPT recipient devices. Coil 200d may be turned off.

The energy transfer efficiency of an established wireless charging pathway depends, among other factors, on the location (e.g., orientation/separation) of the WPT recipient device relative to the coil 200a-d. As further described below, the energy transfer efficiency may be an objective according to which the coils of a WPT source/recipient device are configured. Other desired objectives may include, for example and without limitation, reducing the charging time of one or more WPT recipient devices, increasing the amount of power delivered to one or more WPT recipient devices, reducing electromagnetic interference with other nearby devices, reducing human exposure to radiation, and reducing potential heating of the environment.

Figure 2B:
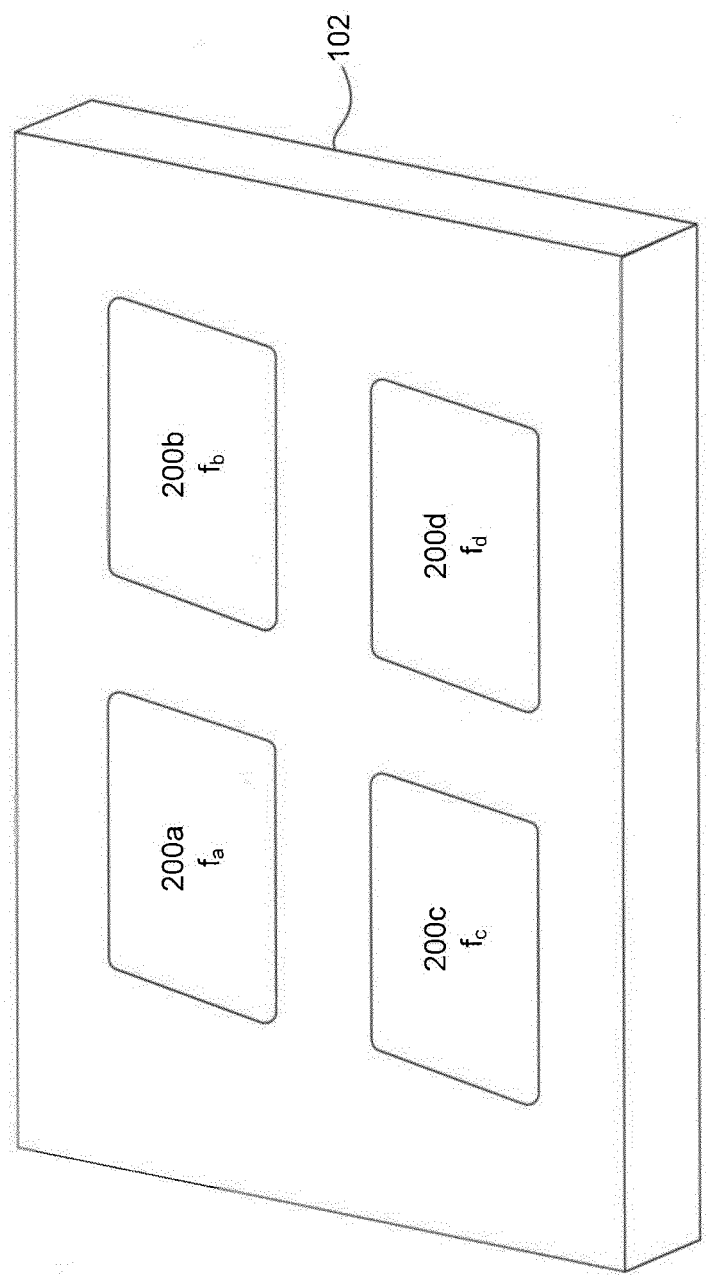
FIG. 2B illustrates an example WPT source device according to an embodiment of the present disclosure.

In addition to enabling one or more wireless charging pathways as described above, embodiments allow wireless charging to be performed over one or more frequencies within an environment. An example embodiment 200B of WPT source device 102, which may be used to establish one or more wireless charging paths over one or more respective frequencies, is shown in FIG. 2B. In particular, in example embodiment 200B, coils 200a-d are configured to operate at respective frequencies $f_{a-d}$. The respective frequencies $f_{a-d}$ may be overlapping or distinct from one another. Coils 200a-d may be configured to operate at the respective frequencies $f_{a-d}$ at manufacture time or during operation.

In an embodiment, the respective frequencies $f_{a-d}$ are selected and may be re-configured during operation, either individually or collectively. For example, the selection and/or re-configuration of one or more of the frequencies $f_{a-d}$ may be done based on one or more of current charging needs of WPT recipient devices, current orientations and/or separation distances of WPT recipient devices relative to WPT source device 102, current usage of the frequency band designated for WPT, channel/band noise, human presence, and other related information from WPT source device 102 and WPT recipient devices.

For example, in an embodiment, WPT source device 102 may estimate the locations (e.g., separation distances from WPT source device 102) of present WPT recipient devices and select the frequencies $f_{a-d}$ used by coils 200a-d to enhance the overall energy transfer efficiency of established wireless charging pathways. In an embodiment, the selection approach uses lower frequencies for pathways charging closer recipient devices and higher frequencies for pathways charging more distant recipient devices. An example embodiment for estimating the location of a WPT recipient device relative to a WPT source device is described with reference to FIG. 7 below.

In another embodiment, one or more of coils 200a-d may be configured, either at manufacture time or during operation, to establish high-resonance or low-resonance wireless charging pathways with recipient devices. In an embodiment, high-resonance wireless charging pathways are realized by tuning the source and/or recipient inductive structures to resonate at the same frequency. For example, in an embodiment, WPT source device 102 may tune one or more of coils 200a-d (which may include tunable elements) to match a resonance frequency of an inductive structure of a recipient device.

High-resonance wireless charging pathways typically provide greater range than low-resonance pathways (high-resonance is typically achieved using a high K transmitter coil and by having a low coupling coefficient K; the reverse conditions provide low-resonance). Accordingly, in an embodiment, resonance may be used, in combination with or as an alternative to frequency selection, depending on the locations of present WPT recipient devices. A method according to an embodiment for using resonance based on the locations of WPT recipient devices is illustrated by process flowchart 300 of FIG. 3.

Figure 3:
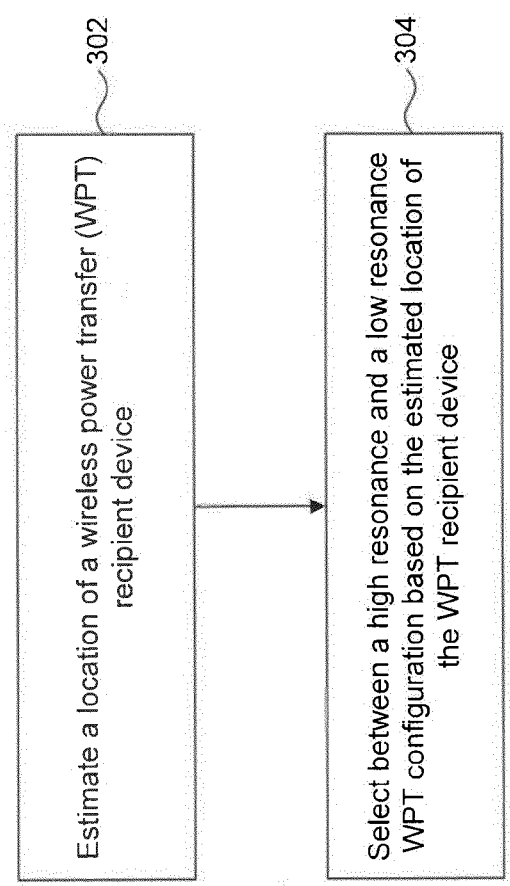
FIG. 3 is a process flowchart of a method according to an embodiment of the present disclosure.

As shown in FIG. 3, process 300 begins in step 302, which includes estimating a location of a WPT recipient device. In embodiments, step 302 may be performed by the WPT source device and/or the WPT recipient device. An example embodiment for estimating the location of a WPT recipient device relative to a WPT source device is described with reference to FIG. 7 below. In an embodiment, the location estimate must only satisfy a pre-defined level of accuracy. For example, step 302 may include determining whether or not the WPT recipient is within a pre-defined separation distance (e.g., 5 mm) from the WPT source device. In an embodiment, this determination is based on a measured coupling between the source and recipient devices.

Subsequently, process 300 proceeds to step 304, which includes selecting between a high-resonance and a a-low resonance WPT configuration based on the estimated location of the WPT recipient device. In an embodiment, step 304 may be performed by the WPT source device. The high-resonance or low-resonance WPT configuration may involve one or more coils of the WPT source device. For example, referring to FIG. 2A, WPT source device 102 may configure one or more of coils 200a-d to establish a high-resonance WPT configuration with a recipient device if the recipient device is more than 5 mm away from WPT source device 102. Alternatively, one or more of coils 200a-d may be configured to establish a low-resonance WPT configuration with the recipient device if the recipient device is within 5 mm from the WPT source device 102.

As would be understood by a person of skill in the art based on the teachings herein, other attributes of the location of the recipient device may also be used in determining the WPT configuration in step 304. For example, in addition to separation, the orientation of the recipient device relative to the WPT source device may be used.

In an embodiment, process 300 may further include transitioning from a high-resonance WPT configuration to a low-resonance WPT configuration, or vice versa, based on a change in the location of the WPT recipient device. For example, if the WPT recipient device is moved closer to the WPT source device, a switch from a high-resonance WPT configuration to a low-resonance WPT configuration may be made.

In other embodiments, a high-resonance WPT configuration is selectively used based on other considerations (in addition to or as an alternative to the location of the WPT recipient device). One consideration may be human presence in the vicinity of the WPT source, which may discourage the use of a high-resonance WPT configuration to reduce human radiation exposure. Accordingly, in an embodiment, a high-resonance WPT configuration is used only when selected manually by a user (e.g., the default being not to use high-resonance WPT), when human presence is not detected, and/or during select hours of the day (e.g., night hours). A high-resonance WPT configuration may be terminated or a transition to a low-resonance WPT configuration may occur once human presence is detected. Further, in another embodiment, a high-resonance WPT configuration is used at a low power, and may be used only when the recipient device is at very low battery power.

As would be understood by a person of skill in the art based on the teachings herein, the use of a high-resonance/low-resonance WPT configuration may be only one aspect of a WPT configuration affected by human presence. More generally, human presence may cause other aspects of a WPT configuration to be adapted according to embodiments as further described below with reference to FIG. 4.

Figure 4:
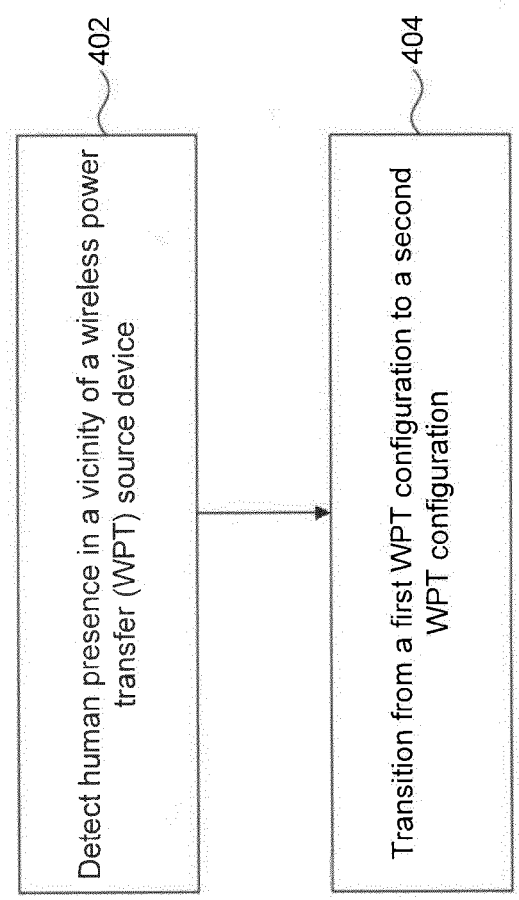
FIG. 4 is a process flowchart of a method according to an embodiment of the present disclosure.

FIG. 4 is a process flowchart 400 of a method according to an embodiment of the present disclosure. As shown in FIG. 4, process 400 begins in step 402, which includes detecting human presence in a vicinity of a WPT source device. In an embodiment, human presence is detected using one or more sensors available in the WPT source device or in another device. Example sensors may include motion sensors, contact sensors, cameras, microphones, thermal imagers, seismic and inertial sensors, ultrasonic sensors, passive radar sensors, capacitive proximity sensors, etc. Alternatively or additionally, human presence is inferred by detecting a mobile device in the vicinity of the WPT source device. The mobile device may communicate its presence to the WPT source device. Alternatively, the mobile device position may be communicated by a positioning system (e.g., indoor positioning system) to the WPT source device.

Once human presence is detected, process 400 proceeds to step 404, which includes transitioning from a first WPT configuration to a second WPT configuration. In an embodiment, as described above, the first WPT configuration is a high-resonance WPT configuration and the second WPT configuration is a low-resonance configuration. Alternatively or additionally, the first WPT configuration is a high frequency and/or high power WPT configuration and the second WPT configuration is a low frequency and/or low power configuration.

Figure 2C:
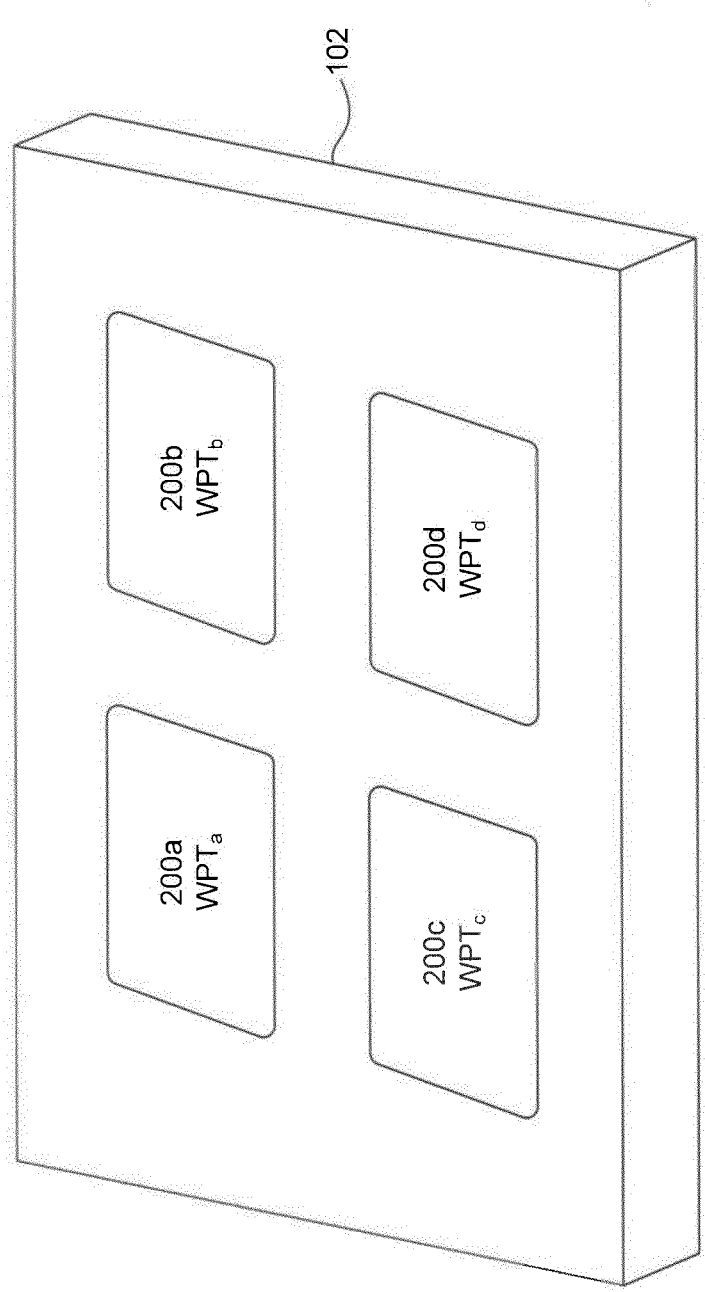
FIG. 2C illustrates an example WPT source device according to an embodiment of the present disclosure.

In another aspect, embodiments enable wireless charging according to one or more WPT standards within an environment. An example embodiment 200C of WPT source device 102, which may be used to establish one or more wireless charging paths using one or more WPT standards, is shown in FIG. 2C. In particular, in example embodiment 200C, coils 200a-d are configured to operate with respective WPT standards $WPT_{a-d}$. The respective WPT standards $WPT_{a-d}$ may be overlapping or distinct from one another. Coils 200a-d may be configured to operate according to the respective WPT standards $WPT_{a-d}$ at manufacture time or during operation. In an embodiment, configuring a coil 200 during operation to operate per a particular WPT standard may include tuning the coil circuitry according to coil/antenna structure characteristics of the particular standard.

In an embodiment, the respective standards $WPT_{a-d}$ are selected and may be re-configured during operation, either individually or collectively. For example, the selection and/or re-configuration of one or more of the WPT standards $WPT_{a-d}$ may be based on one or more of current charging needs of WPT recipient devices, current WPT standards supported by WPT recipient devices, current orientations and/or separation distances of WPT recipient devices relative to WPT source device 102, human presence, and other related information from WPT source device 102 and WPT recipient devices.

For example, in an embodiment, WPT source device 102 may determine the WPT standards supported by present WPT recipient devices, and then configure the WPT standards of one or more of coils 200a-d accordingly. In another embodiment, WPT source device 102 may determine that a recipient device supports two different WPT standards, and therefore may configure one or more of coils 200a-d to operate according to the WPT standard best suited for the current location and/or charging needs of the recipient device. Other criteria for configuring the WPT standards of coils 200a-b may also be used.

Figure 2D:
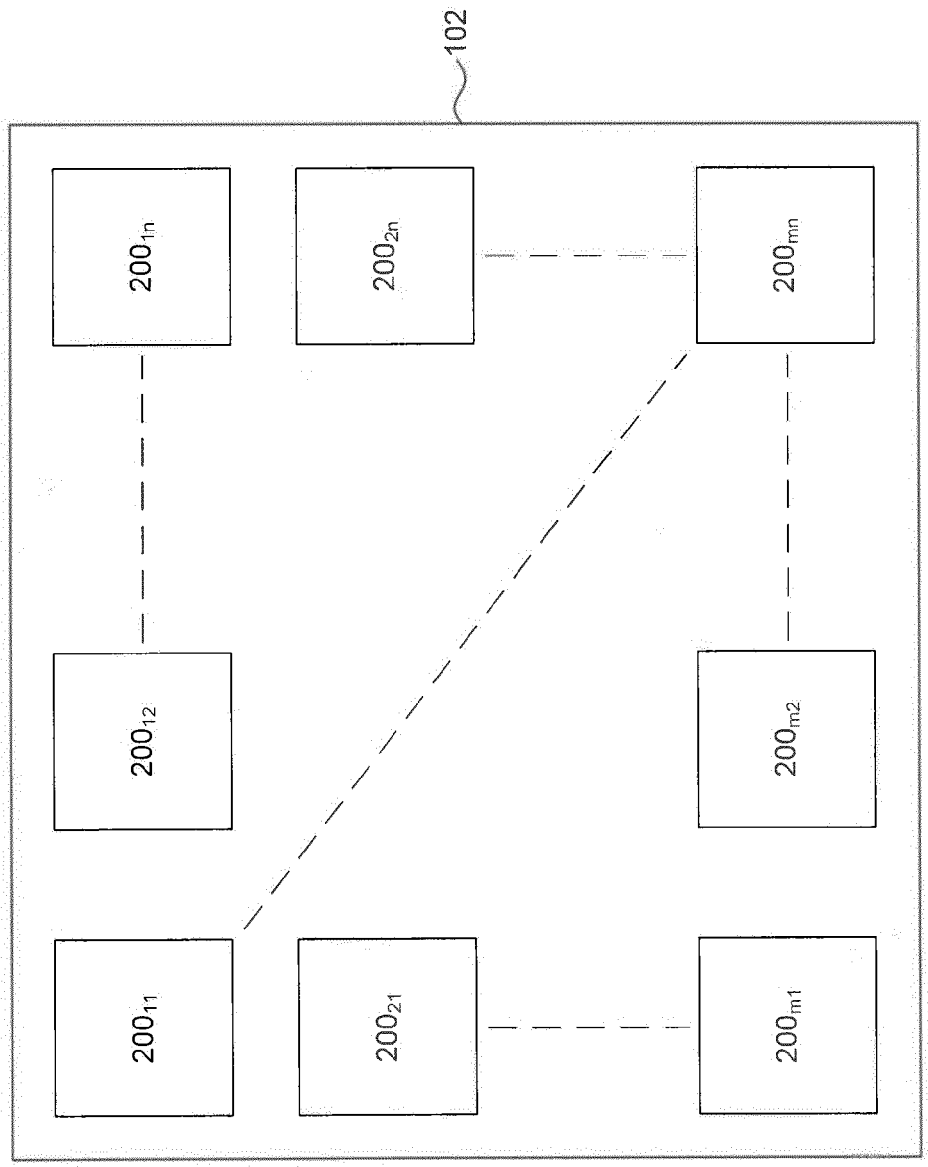
FIG. 2D illustrates an example WPT source device according to an embodiment of the present disclosure.
Figure 2E:
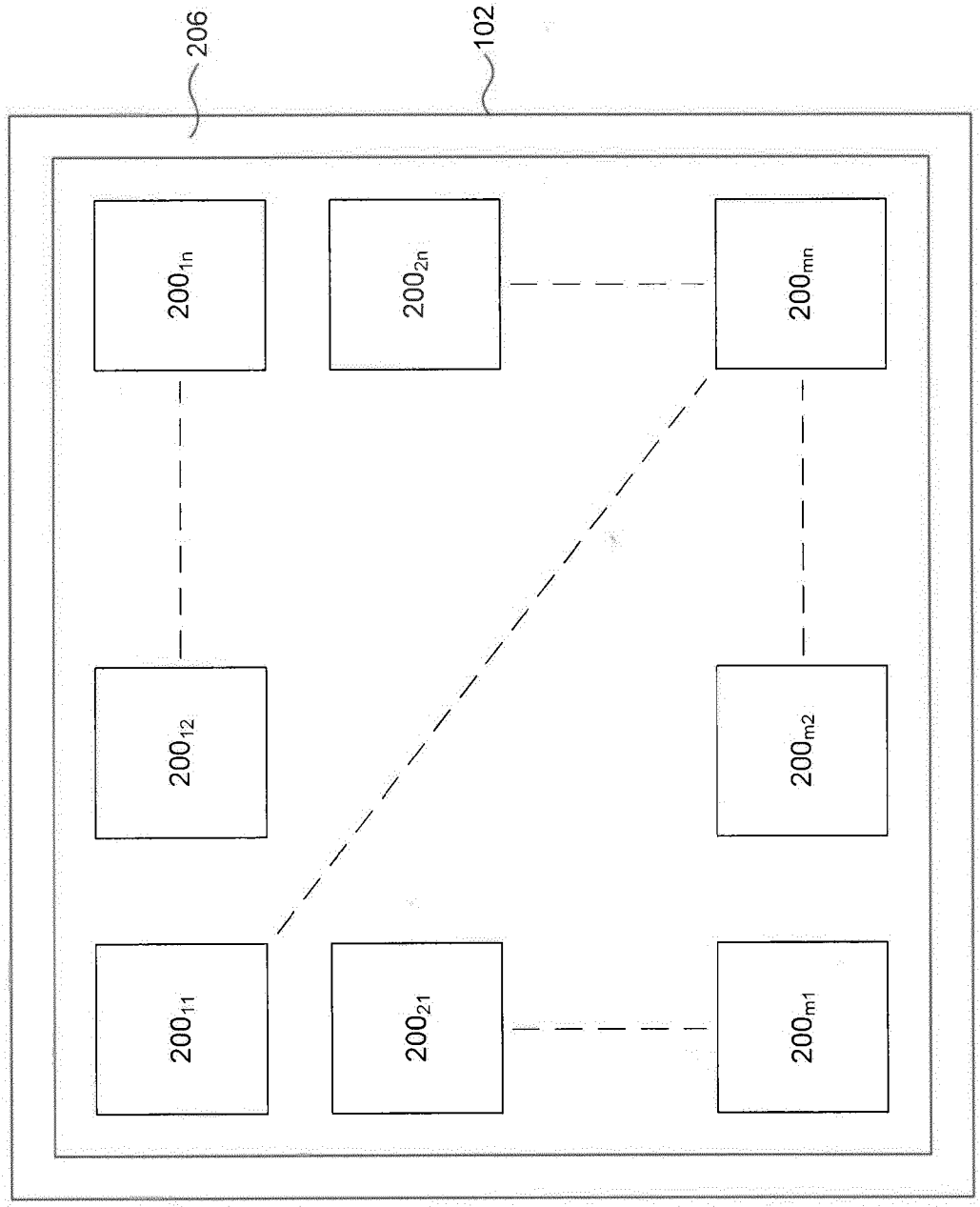
FIG. 2E illustrates an example WPT source device according to an embodiment of the present disclosure.
Figure 2F:
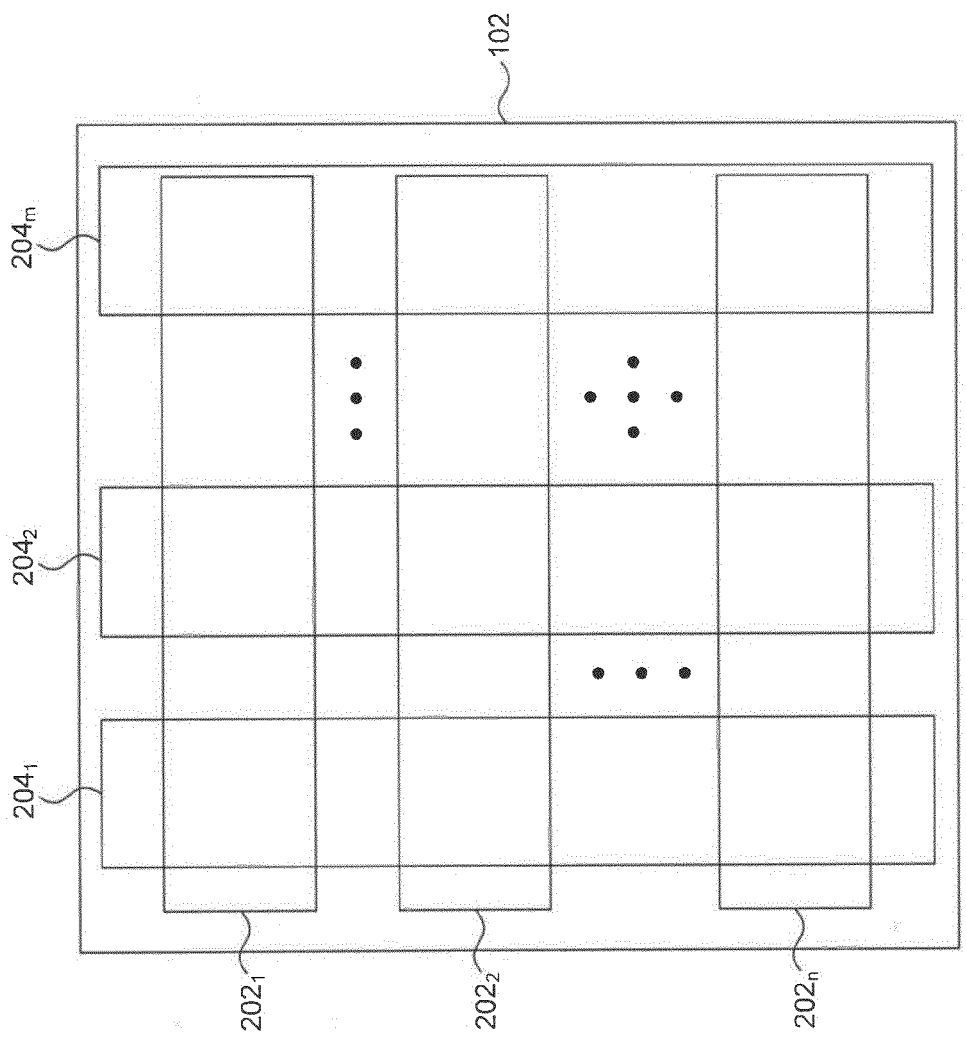
FIG. 2F illustrates an example WPT source device according to an embodiment of the present disclosure.

As would be understood by a person of skill in the art based on the teachings herein, WPT source device embodiments are not limited to the example embodiments described in FIGS. 2A-2C above. For example, the WPT source device may have a different shape than shown in FIGS. 2A-C. In addition, the WPT source device may include more or less coils than shown in FIGS. 2A-C, and the coils may or may not be uniform in size and shape. For example, as shown in FIG. 2D, in an example embodiment 200D, WPT source device 102 includes an m×n coil array formed by non-overlapping coils 200 in a tile configuration. In another example embodiment 200E, shown in FIG. 2E, WPT source device 102 further includes a coil structure 206 that underlies the coil array (e.g., on a different substrate). Coil structure 206 may enhance the vertical propagation performance of wireless charging pathways. In a further example embodiment 200F, shown in FIG. 2F, WPT source device 102 includes a plurality of row coils $202_{1-n}$ that overlap (e.g., on different layers) with a plurality of column coils $204_{1-m}$, where n and m are integers.

In each of the example, embodiments described above, coils in a WPT source device may be controlled individually or collectively. Further, the coils may be controlled to emulate collectively coils of different sizes, shapes, and characteristics, and/or to manipulate established wireless charging pathways (or electromagnetic fields) as desired. For example, the coils may be controlled, individually or collectively, to enhance the energy transfer efficiency of an established wireless charging pathway, reduce the charging time of one or more WPT recipient devices, increase the amount of power delivered to one or more WPT recipient devices, reduce electromagnetic interference with other nearby devices, reduce human exposure to radiation, and/or reduce potential heating of the environment.

In the following, example embodiments for controlling a coil in a WPT source device are provided. These examples are provided for the purpose of illustration and are not limiting. Although described in the context of a WPT source device, the same or similar embodiments can be implemented in a WPT recipient device.

Figure 2G:
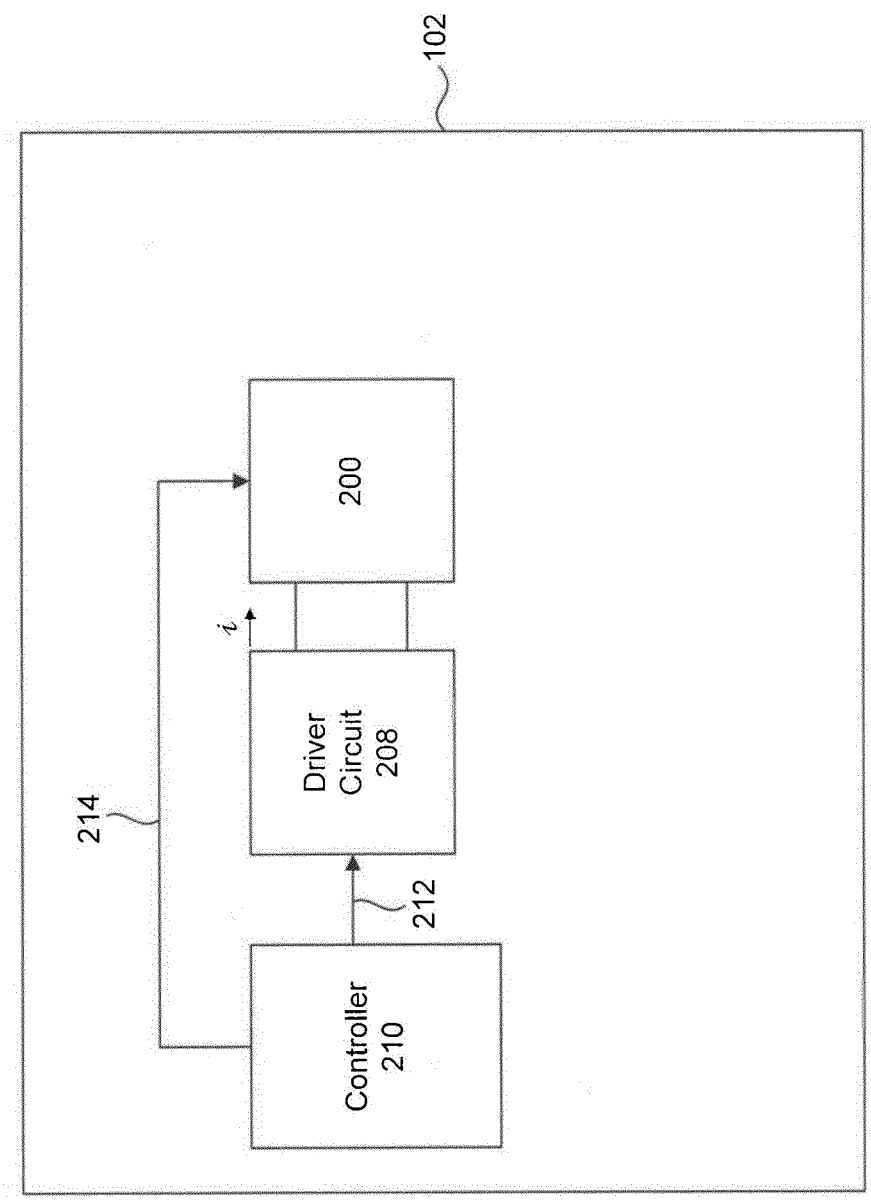
FIG. 2G illustrates an example WPT source device according to an embodiment of the present disclosure.

FIG. 2G illustrates an example embodiment 200G of WPT source device 102 according to an embodiment of the present disclosure. Example embodiment 200G may include any number of coils, but for simplification is illustrated with a single coil in FIG. 2G. As shown in FIG. 2G, example embodiment 200G includes a coil 200, a driver circuit 208, and a controller 210. In embodiments including multiple coils, each coil 200 may have a dedicated driver circuit 208.

Driver circuit 208 is configured to generate a current for driving coil 200. The current is a time-varying current (e.g., alternating current) that produces a time-varying electromagnetic field in coil 200. Driver circuit 208 is controlled by controller 210 via a control signal 212. In an embodiment, controller 210 controls at least one of the amplitude, phase, frequency, and duty cycle of the current generated by driver circuit 208 (the current may be a square wave, for example). As such, controller 210 can control the electromagnetic field produced by coil 200, and consequently the characteristics of any wireless charging pathway established between WPT source device 102 and WPT recipient devices. Controller 210 may also control coil 200 via a control signal 214. For example, controller 210 may control coil 200 to tune different components (e.g., capacitors, inductors, etc.) of coil 200 and/or to adjust the active circuit structure of coil 200. In an embodiment, controller 210 may configure coil 200 for a particular WPT standard and/or frequency operation via control signal 214.

Figure 2H:
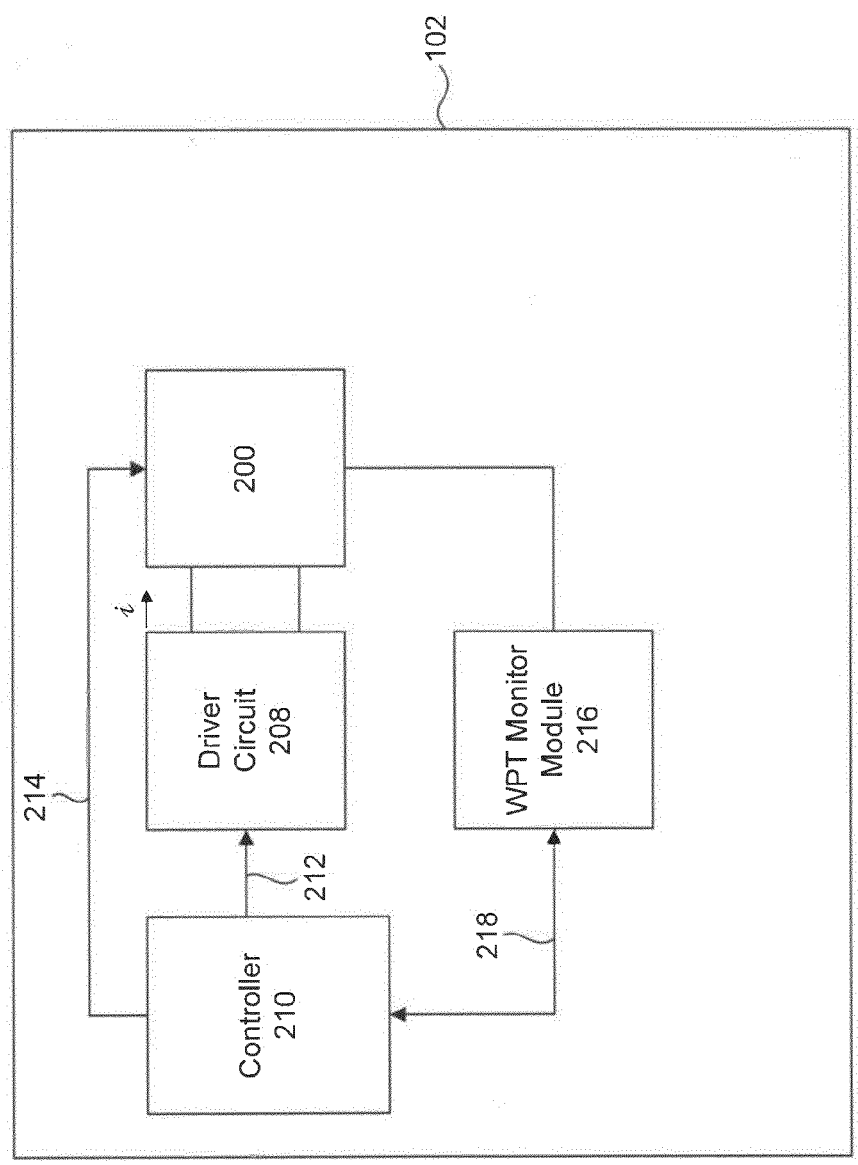
FIG. 2H illustrates an example WPT source device according to an embodiment of the present disclosure.

FIG. 2H illustrates another example embodiment 200H of WPT source device 102 according to an embodiment of the present disclosure. Example embodiment 200H may include any number of coils, but for simplification is illustrated with a single coil in FIG. 2H. As shown in FIG. 2H, example embodiment 200H is similar to embodiment 200G described above, but further includes a WPT monitor module 216.

WPT monitor module 216 is configured to generate various types of WPT related information, which may be used in selecting and/or re-configuring the WPT configuration of WPT source device 102. In an embodiment, controller 210 communicates with WPT monitor module 216 via an interface 218 to retrieve information for use in configuring coil 200. Alternatively or additionally, WPT monitor module 216 sends control signals to controller 210 via interface 218 based on generated WPT related information. Controller 210 controls coil 200 based on the control signals.

In embodiments, WPT monitor module 216 may generate the WPT related information either by direct measurement (e.g., from driver circuit 208 and/or coil 200) and/or by communication with WPT recipient devices. For example, and without limitation, the WPT related information may include at least one of current charging needs of WPT recipient devices, current WPT standards supported by WPT recipient devices, current orientations and/or separation distances of WPT recipient devices relative to WPT source device 102, current usage of the frequency band designated for WPT, channel/band noise, and other related information from WPT source device 102 and WPT recipient devices. Alternatively or additionally, WPT monitor module 216 may generate the WPT related information from sensors present in WPT source device 102 or in another device, as further described below with reference to FIG. 2I.

In an embodiment, embodiment 200H may be configured to estimate the location of a WPT recipient device and to configure at least one aspect of the WPT configuration of WPT source device 102 in accordance with the estimated location of the WPT recipient device. This embodiment is further described below with reference to an example 500 shown in FIG. 5.

Figure 5:
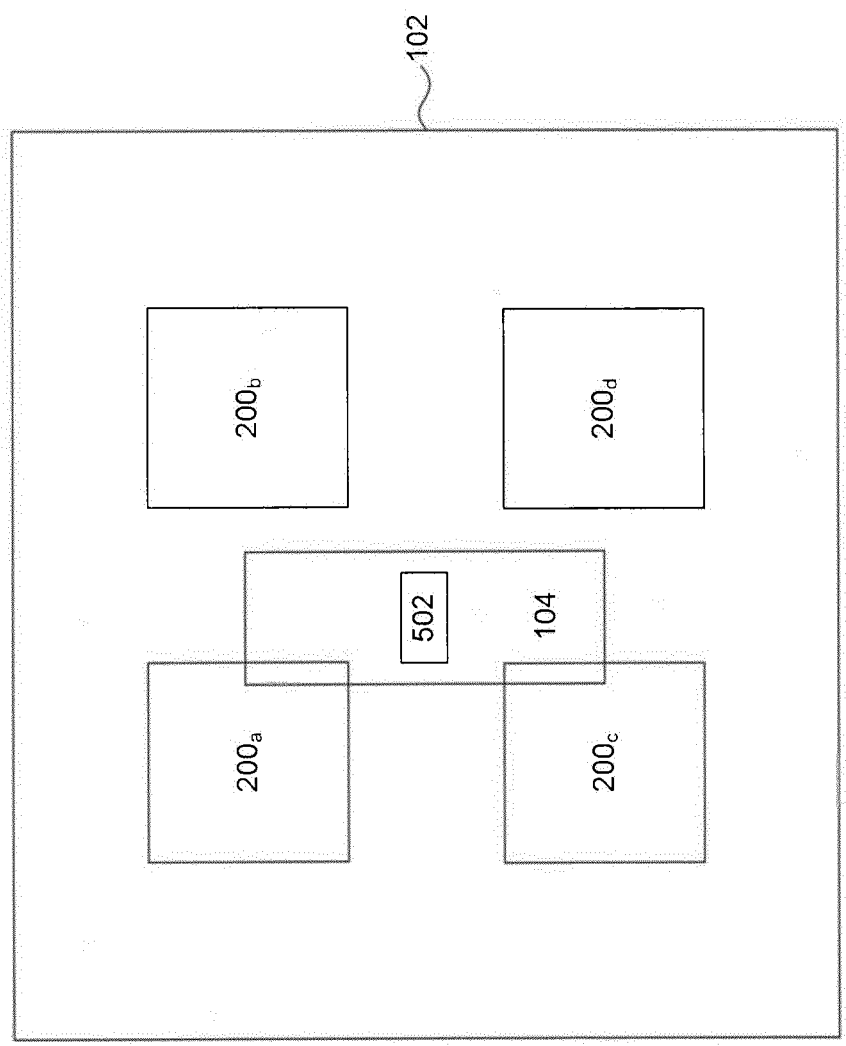
FIG. 5 illustrates an example environment according to an embodiment of the present disclosure.

As shown in FIG. 5, example 500 includes WPT source device 102, including coils 200a-d, and WPT recipient device 104, including a coil 502. WPT source device 102 is assumed to implement embodiment 200H described above. Thus, WPT source device 102 further includes controller 210, at least one driver circuit 208, and WPT monitor module 216 (not shown in FIG. 5). WPT recipient device 104 is placed on top of WPT source device 102 as shown in FIG. 5. As would be understood by a person of skill in the art, WPT source device 102 may include more or less coils 200 than shown in example 500.

Figure 7:
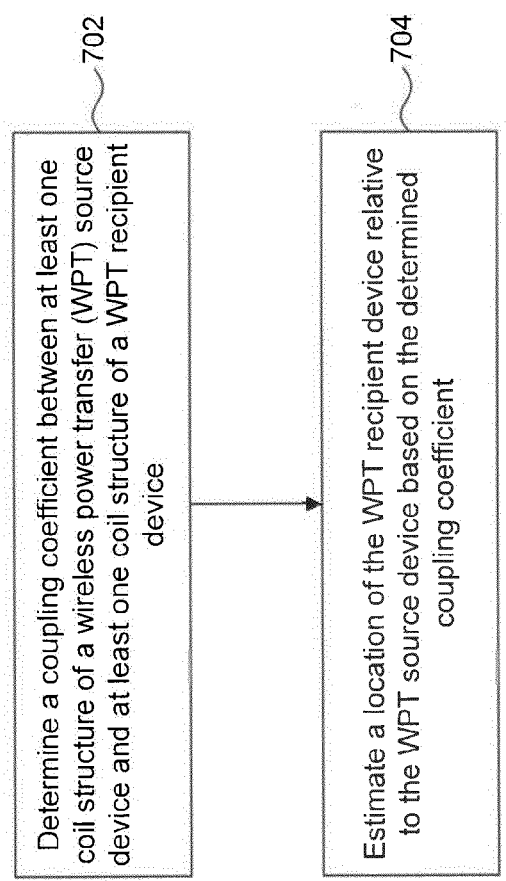
FIG. 7 is a process flowchart of a method according to an embodiment of the present disclosure.

In an embodiment, the location of WPT recipient device 104 (or more particularly the location of coil 502) relative to WPT source device 102 is determined in accordance with a process 700 shown in FIG. 7. As shown in FIG. 7, process 700 includes steps 702 and 704. Process 700 begins in step 702, which includes determining a coupling coefficient between at least one coil structure of a WPT source device and at least one coil structure of a WPT recipient device. In an embodiment, step 702 is performed as further described below with respect to FIG. 8.

Figure 8:
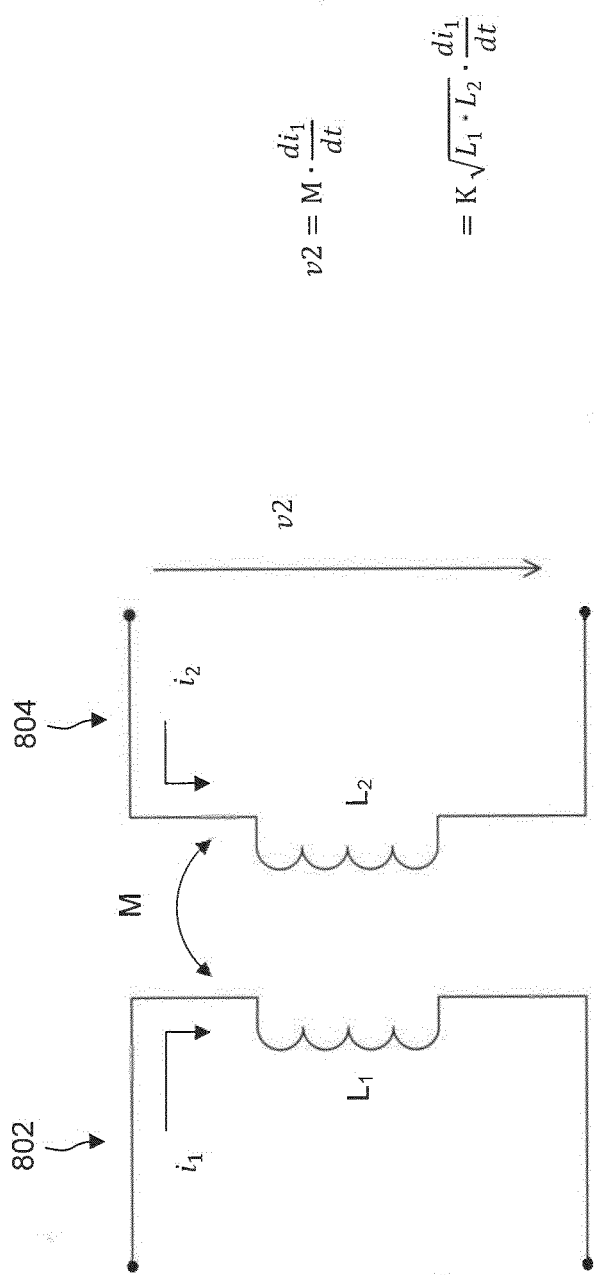
FIG. 8 illustrates an embodiment of the present disclosure.

FIG. 8 illustrates an example embodiment for determining the coupling coefficient between a coil 802 and a coil 804. As shown in FIG. 8, a current $i_1$ is driven through coil 802 to induce a voltage $v_2$ across coil 804. The voltage $v_2$ is related to the current $i_1$ as $M(di_1/dt)$, where M is the mutual inductance of coil 802 and coil 804 and $(di_1/dt)$ is the rate of change of the current $i_1$. The mutual inductance M can thus be determined by dividing the voltage $v_2$ by the rate of change $(di_1/dt)$ of the current. From the mutual inductance M, the coupling coefficient k between coils 802 and 803 can be determined as $M/\sqrt{L_1 L_2}$, where $L_1$ is the inductance of coil 802 and $L_2$ is the inductance of coil 804. Thus, the coupling coefficient k between coil 802 and coil 804 is calculated as a function of the voltage $v_2$, the rate of change $(di_1/dt)$ of current $i_1$, and the inductances $L_1$ and $L_2$ of coils 802 and 804.

Returning to example 500 of FIG. 5, in an embodiment, the coupling coefficient k between one of coils 200a-d and coil 502 is determined by WPT monitor module 216 in accordance with example embodiment 800. In particular, WPT monitor module 216 may receive the voltage $v_2$ and the inductance $L_2$ of coil 502 from WPT recipient device 104, and may measure at least one of the rate of change $(di_1/dt)$ of current $i_1$ and the inductance $L_1$ of coil 200 from driver circuit 208 and/or coil 200. WPT monitor module 216 may then calculate the coupling coefficient k between coil 200 and coil 502 as described above in FIG. 8.

In another embodiment, the rate of change $(di_1/dt)$ of current $i_1$, the inductance $L_1$ of coil 200, and/or the inductance $L_2$ of coil 502 may be known a priori to WPT monitor module 216 (e.g., fixed), and thus WPT monitor module 216 only needs to receive the measurement of the voltage $v_2$ from WPT recipient device 104 in order to calculate the coupling coefficient k.

In embodiments, WPT monitor module 216 may calculate the coupling coefficients between coils 200a-d and coil 502 either sequentially or in parallel. For example, WPT monitor module 216 may determine the coupling coefficients between coils 200a-d and coil 502, one at a time, using the above described approach (time division duplexing). For better accuracy, when the coupling coefficient between one of coils 200a-d and coil 502 is being determined, the other coils can be turned off. Alternatively, WPT monitor module 216 may determine the coupling coefficients between coils 200a-d and coil 502 in parallel by operating coils 200a-d with different (e.g., non-overlapping) frequencies (frequency division duplexing).

Returning to FIG. 7, after the coupling coefficient is determined in step 702, process 700 proceeds to step 704, which includes estimating a location of the WPT recipient device relative to the WPT source device based on the determined coupling coefficient. In embodiments, one or more coupling coefficients may be determined in step 702, with better location accuracy achieved with a higher number of determined coupling coefficients.

For instance, returning to example 500 of FIG. 5, WPT monitor module 216 may determine the coupling coefficients between each of coils 200a-d and coil 502, before estimating the location of WPT recipient device 104 (or more particularly coil 502) based on the determined coupling coefficients. In an embodiment, the determined coupling coefficients represent a coupling coefficient fingerprint which is compared to pre-determined fingerprints associated with known location points on the surface of WPT source 102. The pre-determined fingerprints may be measured by placing coils of various known inductance values at the known location points and measuring their coupling coefficients with the coils of WPT source device 102. Interpolation and/or extrapolation over inductance and/or coupling coefficients may be used to estimate the location of WPT recipient device 104 based on the pre-determined fingerprints.

After estimating the location of WPT recipient device 104, WPT monitor module 216 may communicate with controller 210 to configure at least one aspect of the WPT configuration of WPT source device 102 in accordance with the estimated location of WPT recipient device 104. For example, based on the estimated location of WPT recipient device 104, WPT monitor module 216 may determine that energy transfer may be enhanced by adjusting the frequency of the WPT configuration, transitioning to a high-resonance WPT configuration, and/or by introducing certain phase shifts between established wireless charging pathways so as to combine constructively at WPT recipient device 104. Alternatively or additionally, WPT monitor module 216 may determine that power transfer efficiency may be enhanced by turning off coils (e.g., 200b and 200d) whose coupling coefficients with coil 502 are below a pre-determined threshold. As would be understood by a person of skill in the art based on the teachings herein, various other algorithms, heuristics, and WPT related objectives may be also be used.

Figure 6:
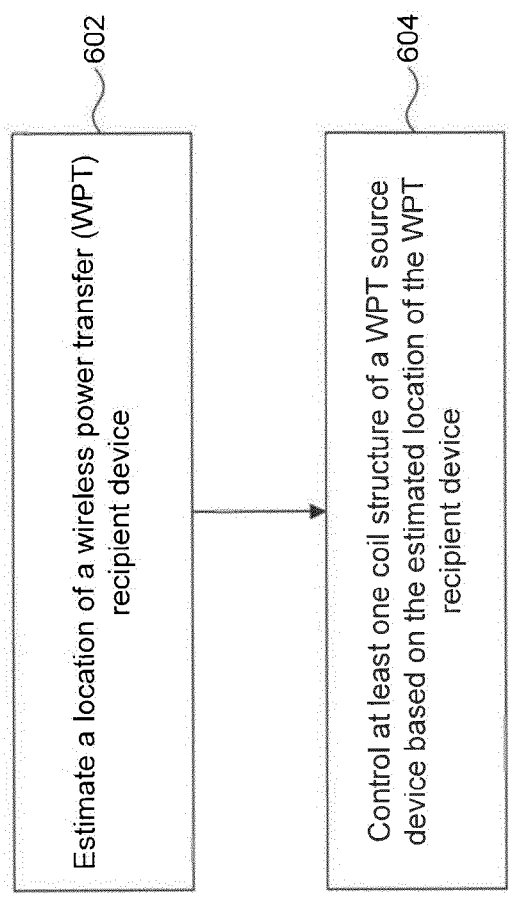
FIG. 6 is a process flowchart of a method according to an embodiment of the present disclosure.

In accordance with the above description, FIG. 6 illustrates a process flowchart 600 of a method according to an embodiment of the present disclosure. As shown in FIG. 6, process 600 begins in step 602, which includes estimating a location of a WPT recipient device. As described above, step 602 may be performed by a WPT monitor module of a WPT source device. Subsequently, process 600 proceeds to step 604, which includes controlling at least one coil structure of a WPT source device based on the estimated location of the WPT recipient device. As described above, step 604 may also be performed by the WPT monitor module of the WPT source device in conjunction with a controller and/or driver circuitry of the WPT source device.

Figure 2I:
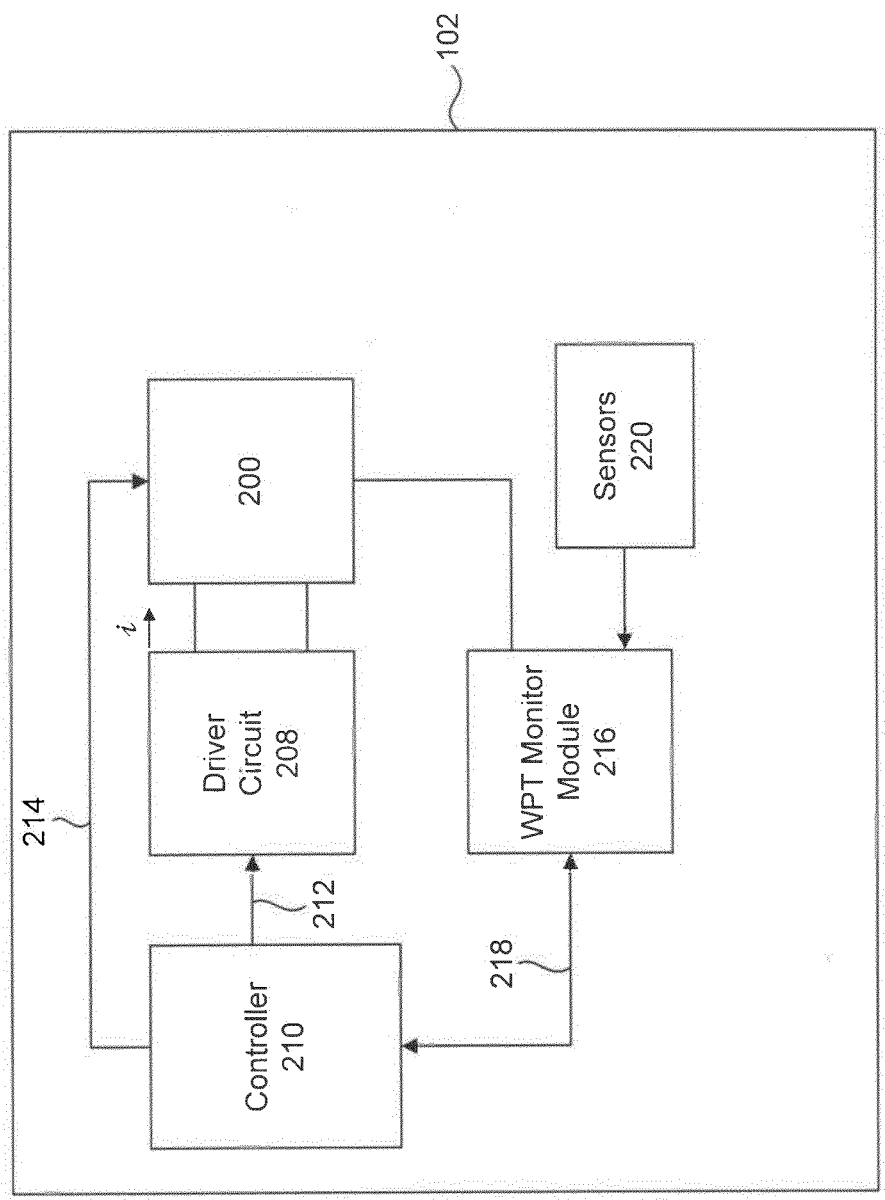
FIG. 2I illustrates an example WPT source device according to an embodiment of the present disclosure.

FIG. 2I illustrates another example embodiment 200I of WPT source device 102 according to an embodiment of the present disclosure. Example embodiment 200I may include any number of coils, but for simplification is illustrated with a single coil in FIG. 2I. As shown in FIG. 2I, example embodiment 200I is similar to embodiment 200H described above, but further includes sensors 220.

Sensors 220 may include motion sensors, contact sensors, cameras, microphones, thermal imagers, seismic and inertial sensors, ultrasonic sensors, passive radar sensors, capacitive proximity sensors, etc. As would be understood by a person of skill in the art, sensors 220 may in implementation be formed of multiple separate modules. Additionally, sensors 220 may include a processor that processes raw measurements from the sensors to generate processed measurements and/or appropriate control signals. Additionally, in other embodiments, some of sensors 220 may be located in devices other than WPT source device 102. For example, some of sensors 220 may be located in a WPT recipient device or other type of device located in a vicinity of WPT source device 102. For example, a WPT recipient device in a vicinity of WPT source device 102 may include thermal sensors, which it uses to alert WPT source device 102 of heating levels in the environment. Based on this information, WPT source device 102 may adjust the WPT configuration.

In an embodiment, sensors 220 provides raw measurements, processed measurements, and/or control signals to WPT monitor module 216 based on sensed events in the vicinity of WPT source device 102. For example, sensors 220 may alert WPT monitor module 216 when human presence is detected or anticipated in the vicinity of WPT source device 102. In another example, sensors 220 may send a control signal to WPT monitor module 216 when a level of measured ambient light falls below a predefined threshold (e.g., indicating night time). In yet another example, sensors 220 may assist WPT monitor module 216 in estimating the location of a WPT recipient device relative to WPT source device 102. Other types of control signals can also be implemented as would be understood by a person of skill in the art based on the teachings herein.

In each of the above examples, WPT monitor module 216 may use the input from sensors 220 in determining and/or re-configuring the WPT configuration of WPT source device 102. For example, embodiment 200I may implement process 400 described above, whereby the WPT configuration of WPT source device 102 is adjusted when human presence is detected or anticipated in the vicinity of WPT source device 102. Similarly, WPT monitor module 216 may re-configure the WPT configuration (e.g., switching to a higher frequency configuration) when the level of measured ambient light falls below the predefined threshold (e.g., indicates night-time).

Figure 9:
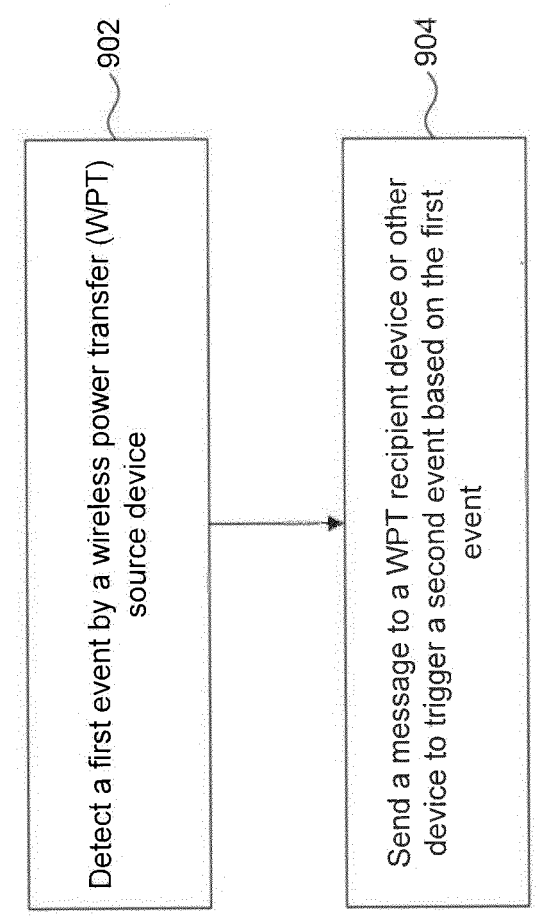
FIG. 9 is a process flowchart of a method according to an embodiment of the present disclosure.

In another embodiment, WPT monitor module 216 may further use the input from sensors 220 and/or from other sources (e.g., driver circuit 208, coil 200, WPT recipient device, etc.) to trigger an event in a WPT recipient device or other device in the vicinity of WPT source device 102. Specifically, WPT monitor module 216 may enable embodiment 200I to implement a process 900 illustrated in FIG. 9. As shown in FIG. 9, process 900 begins in step 902, which includes detecting a first event by a WPT source device. In embodiments, the first event may be any event that the WPT source can detect, including WPT related events and events occurring in the environment of the WPT source device.

Subsequently, process 900 proceeds to step 904, which includes sending a message to a WPT recipient device or other device to trigger a second event based on the first event. In embodiments, the second event triggered by step 904 may be pre-configured, user-configurable, or determined automatically based on learned user habits, for example. Other conditions (e.g., time of day, human presence, etc.) may also be used in conjunction with the first event detected in step 902 to trigger the event of step 904. Additionally, the second event triggered by step 904 may vary depending on the type of the WPT recipient device. In embodiments, step 904 may be performed by WPT monitor module 216 in conjunction with a wireless transceiver (not shown in FIG. 2I) of WPT source device 102.

As would be understood by a person of skill in the art based on the teachings herein, process 900 may be used to implement a variety of triggers in the environment of the WPT source device. In embodiments, step 902 may include, for example and without limitation, detecting human presence, detecting that a WPT recipient device has been placed on top of the WPT source device (e.g., based on a noted change of coupling coefficient), detecting that a WPT recipient device has been removed from the WPT source device (e.g., based on a noted change of coupling coefficient), detecting a change in ambient light, detecting noise, detecting motion, etc. Step 904 may include, for example and without limitation, sending a message to the WPT recipient device to adjust the WPT configuration of the WPT recipient device (e.g., adjusting the operating frequency, adjusting the recipient coil circuit structure, transitioning from a high-resonance to a low-resonance WPT configuration or vice versa, adjusting the WPT standard, etc.), turn on/off wireless communication features (e.g., WLAN, GPS, etc.), to change a mode of operation of the device (e.g., switch from a silent profile to a normal profile or vice versa, automatic call forwarding, route calls to a headset, etc.), to adjust graphical user interface (GUI) settings of the device, to turn on/off an application available on the device, etc. Alternatively, or additionally, step 904 may include sending a message to another nearby device (e.g., TV, gaming console, light switch, etc.) turning it on/off.

Figure 1B:
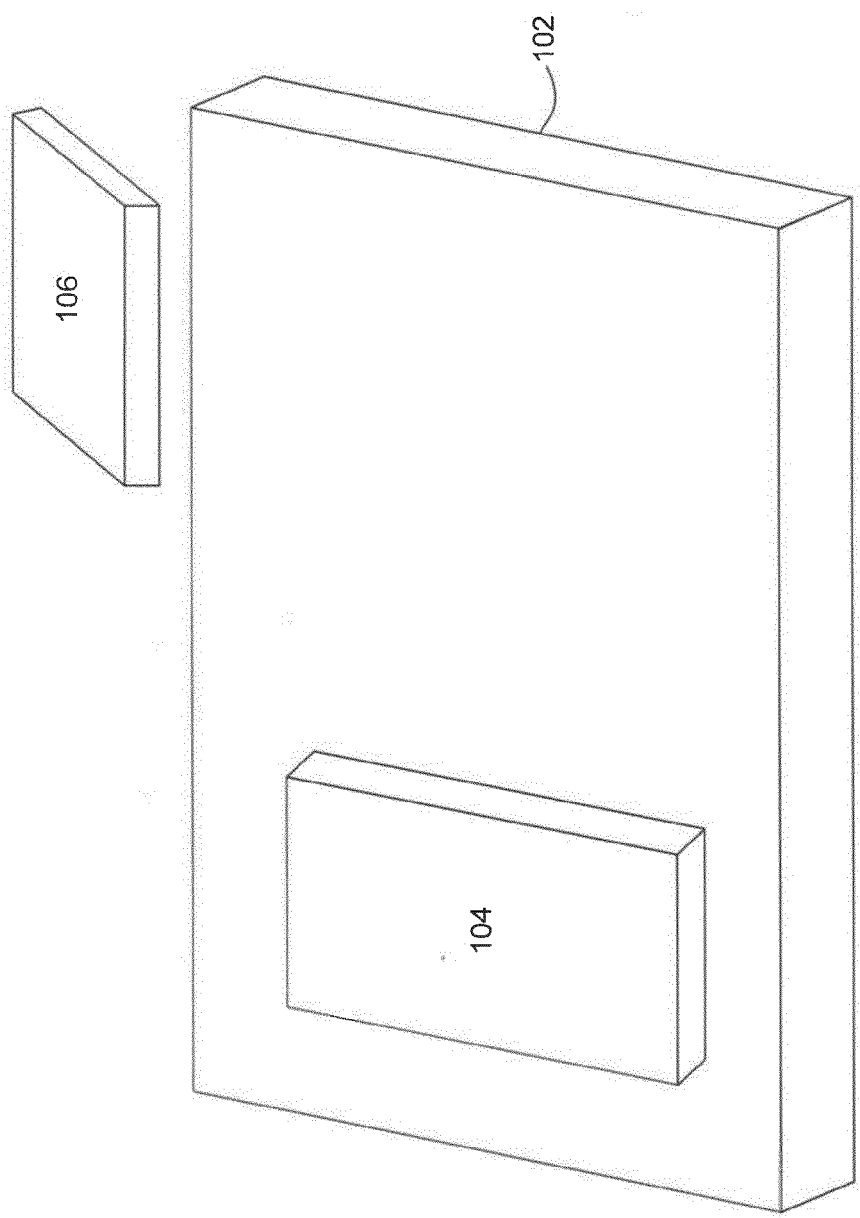
FIG. 1B illustrates an example environment according to an embodiment of the present disclosure.

Embodiments have been described above primarily with reference to example environment 100A of FIG. 1A, which includes a single WPT source device 102 and a single WPT recipient device 104. As would be understood by a person of skill in the art based on the teachings herein, embodiments are not limited to example environment 100A. For example, embodiments may be readily used in an example environment 100B, which as illustrated in FIG. 1B includes a plurality of recipient devices, such as WPT recipient devices 104 and 106, being wirelessly charged by WPT source device 102. WPT recipient devices 104 and 106 may or may not be in direct contact with WPT source device 102. Further, WPT recipient devices 104 and 106 may or may not be the same type of device, implement the same WPT standard, have the same charging needs, etc.

Figure 1C:
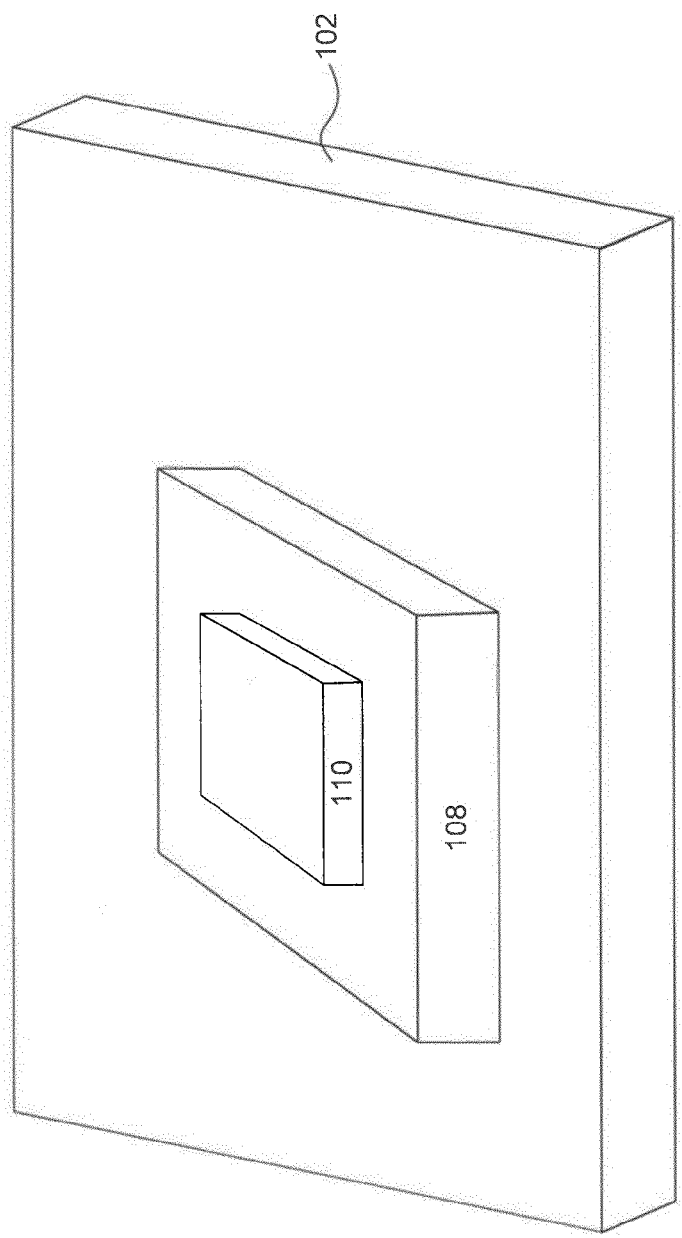
FIG. 1C illustrates an example environment according to an embodiment of the present disclosure.

Additionally, embodiments may be further extended to support an example environment 100C, illustrated in FIG. 1C. Specifically, in example environment 100C, a mobile device 108 may be configured to operate as a WPT recipient device and/or a WPT source device. Mobile device 108 may be, without limitation, a cellular phone, a gaming device, a music player, or a digital camera, for example. As such, mobile device 108 may implement any of the WPT source device features described above, in addition to WPT recipient device features. Mobile device 108 may thus charge another WPT recipient device 110 in its vicinity (e.g., placed on top of it as shown in FIG. 1C), while being charged itself by WPT source device 102. In another embodiment, WPT source device 102 may also charge WPT recipient device 110 at the same time as mobile device 108. The simultaneous wireless charging of mobile device 108 and WPT recipient device 110 may use same or different frequencies, powers, WPT standards, high-resonance/low-resonance WPT configurations, etc. Similarly, the simultaneous wireless charging of WPT recipient device 110 by WPT source device 102 and mobile device 108 may use same or different frequencies, powers, WPT standards, high-resonance/low-resonance WPT configurations, etc.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A wireless power transfer (WPT) source device, comprising:
   a coil;
   a WPT monitor module configured to generate WPT related information; and
   a controller configured to control the coil in response to the generated WPT related information,
   wherein the WPT related information includes a location estimate of a WPT recipient device relative to the WPT source device, and wherein the controller is configured to tune a circuit structure of the coil to establish a high-resonance WPT configuration or a low-resonance WPT configuration with the WPT recipient device based on the location estimate of the WPT recipient device.

2. The WPT source device of claim 1, further comprising:
   a driver circuit configured to receive a control signal from the controller and to produce a current through the coil in response to the control signal.

3. The WPT source device of claim 2, wherein the controller is configured to control at least one of an amplitude, a phase, a frequency, and a duty cycle of the current in response to the generated WPT related information.

4. The WPT source device of claim 1, wherein the location estimate of the WPT recipient device is determined by the WPT source device or obtained from another device.

5. The WPT source device of claim 1, wherein the controller is further configured to control at least one of an operating frequency, a transmission power, an active circuit structure, and an-operating WPT standard of the coil in response to the generated WPT related information.

6. The WPT source device of claim 1, wherein the WPT related information further includes an indication of human presence in a vicinity of the WPT source device.

7. The WPT source device of claim 6, wherein the controller is further configured to control an operating frequency of the coil based on the indication of human presence in the vicinity of the WPT source device.

8. The WPT source device of claim 1, further comprising:
   one or more sensors configured to provide sensor information to the WPT monitor module, wherein the WPT monitor module is further configured to generate the WPT related information based on the sensor information.

9. A wireless power transfer (WPT) source device, comprising:
   a coil;
   a WPT monitor module configured to generate WPT related information; and
   a controller configured to control the coil in response to the generated WPT related information,
   wherein the WPT related information includes a supported WPT standard by a WPT recipient device, and wherein the controller is configured to control the coil to adjust an operating WPT standard of the WPT source device.

10. A method for operating a wireless power transfer (WPT) source device, comprising:
    generating WPT related information; and
    controlling a coil of the WPT source device in response to the generated WPT related information,
    wherein the WPT related information includes a location estimate of a WPT recipient device relative to the WPT source device, and wherein controlling the coil comprises tuning a circuit structure of the coil to establish a high-resonance WPT configuration or a low-resonance WPT configuration with the WPT recipient device based on the location estimate of the WPT recipient device.

11. The method of claim 10, wherein controlling the coil further comprises controlling at least one of an amplitude, a phase, and a frequency of a current produced through the coil.

12. The method of claim 10, wherein controlling the coil further comprises controlling at least one of an operating frequency, a transmission power, an active circuit structure, and an operating WPT standard of the coil based on the location estimate of the WPT recipient device.

13. The method of claim 10, wherein the WPT related information further includes an indication of human presence in a vicinity of the WPT source device.

14. The method of claim 13, wherein controlling the coil further comprises controlling at least one of an operating frequency, a transmission power, an active circuit structure, and an operating WPT standard of the coil based on the indication of human presence in the vicinity of the WPT source device.

15. A system, comprising:
a wireless power transfer (WPT) source device, comprising:
a plurality of first coils;
a WPT monitor module; and
a controller; and
a WPT recipient device having a second coil,
wherein the WPT monitor module is configured to estimate a location of the WPT recipient device relative to the WPT source device, wherein the controller is configured to control the plurality of first coils in response to the estimated location of the WPT recipient device, and wherein the WPT monitor module is further configured to determine coupling coefficients between the plurality of first coils and the second coil in parallel by operating each of the plurality of first coils at a different frequency, and to estimate the location of the WPT recipient device based on the coupling coefficients.

16. The system of claim 15, wherein the WPT monitor module is further configured to compare the coupling coefficients against pre-determined coupling coefficient fingerprints to estimate the location of the WPT recipient device.

17. The system of claim 15, wherein the controller is further configured to turn off a coil from the plurality of first coils when a respective coupling coefficient from the coupling coefficients is less than a predetermined threshold.

* * * * *